United States Patent [19]

Holmes et al.

[11] Patent Number: 4,533,066

[45] Date of Patent: Aug. 6, 1985

[54] SEED PLANTER, PLANTER ASSEMBLY AND METHOD OF PICKING UP AND DISCHARGING SINGLE SEEDS

[75] Inventors: Robert G. Holmes; Scott A. Shearer, both of Columbus, Ohio

[73] Assignee: Ohio Agricultural Research & Development Center, Wooster, Ohio

[21] Appl. No.: 434,267

[22] Filed: Sep. 29, 1982

[51] Int. Cl.³ .................. B65G 15/02; B65H 3/08
[52] U.S. Cl. ........................ 221/211; 221/1; 221/260; 111/78; 111/85
[58] Field of Search .......... 111/36, 61, 85, 77, 111/78; 221/210, 211, 253, 260, 263, 266, 277, 278, 167, 1

[56] References Cited

U.S. PATENT DOCUMENTS

| | | | |
|---|---|---|---|
| 3,412,908 | 11/1968 | Ferrault | 111/77 X |
| 3,548,765 | 12/1970 | Grataloup | 111/77 X |
| 3,637,108 | 1/1972 | Loesch et al. | 221/211 |
| 4,047,638 | 9/1977 | Harrer et al. | 221/266 |
| 4,241,849 | 12/1980 | Harrer | 221/266 |

Primary Examiner—Joseph J. Rolla
Assistant Examiner—Kevin P. Shaver
Attorney, Agent, or Firm—Sidney W. Millard

[57] ABSTRACT

A seed planter comprises a seed transport member having a porous surface and an air jet directed normally to this surface. The porous surface is moved past a plurality of seeds, whereupon the air jet retains a single seed on the porous surface, and the seed transport member carries this retained seed to a seed unloading station, where the impingement of the air jet upon the surface is interrupted, thus allowing the retained seed to fall from the porous surface. The planter is capable of metering both flat and spherical seeds very accurately at metering rates of about 40 seeds per second and can be made of small width so that a single row of planters on a planter assembly can plant closely spaced rows. A planter assembly capable of planting multiple rows of seeds is provided by mounting a plurality of the seed planters on a frame.

20 Claims, 5 Drawing Figures

SEED PLANTER, PLANTER ASSEMBLY AND METHOD OF PICKING UP AND DISCHARGING SINGLE SEEDS

BACKGROUND OF THE INVENTION

This invention relates to a seed planter, to a planter assembly and to a method of picking up and discharging single seeds. More specifically, the invention relates to a seed planter, planter assembly and method in which accurate metering of the seeds is achieved by holding the seeds against a surface by means of jets of gas.

In the application, the term "seed planter" is used to denote an apparatus which supplies a single stream of seeds, theoretically one at a time. In normal agricultural use, a machine is used which comprises a number (typically about 20) of seed planters mounted upon a framework and provided with an appropriate drive mechanism to supply power to the planters. Such a machine, which is normally referred to by farmers as a "planter" is designated herein by the term "planter assembly".

A seed planter must be designed having regard to several different, and often antipathetic, requirements. The planter should of course not damage the seed which it handles, since damage to the seed will reduce the germination rate and consequently the crop yield. In most cases, the seeds should be planted one at a time, and the spacing along a row of seeds should conform accurately to a predetermined value; however, since it may be necessary to vary the spacings between rows because of the type or variety of seeds being planted or because of the environmental conditions under which the seed will be grown, the seed planter should be capable of adjusting the row spacing when desired. In order to reduce the time and cost of planting, the planter should be capable of delivering seeds accurately at a predetermined spacing when the tractor towing a planter assembly incorporating the planters is moving across the field at its maximum working speed, which in the case of most modern tractors is about seven miles (11 km.) per hour. The metering rates involved in operating at this speed are considerable; for example, if seeds are being planted with a six inch (15 cm.) spacing between adjacent seeds in each row, when the tractor is moving at seven miles per hour the planter must meter more than 20 seeds per second. Accuracy of timing in delivering the seeds is crucial; for example, in the example previously given where the planter is metering above 20 seeds per second, a delay of only 50 milliseconds in delivering one seed will cause two seeds to issue from the planter simultaneously, so that one planting position will not receive a seed while the next will receive two seeds instead of one. Even when the actual metering part of the seed planter functions correctly, delays on the order of 100 milliseconds are common in commercial planters because such planters frequently incorporate a delivery chute to control the movement of the seeds after they have passed through the metering part of the planter, and the varying angles at which the metered seeds strike the walls of this delivery chute cause variations in the time of delivery of the seeds. Finally, it is important that a planter have a small width, since the minimum spacing between rows which a planter assembly can achieve is governed by the width of the individual planters. (It is possible to mount two separate rows of planters on a planter assembly, planters in the two rows planting alternate rows of seeds so that the minimum spacing between adjacent rows can be half the width of the planter, but such an arrangement increases the size, complexity and weight of the planter assembly, in particular a more complicated drive train arrangement is needed to supply power to the two rows of planters.)

In the case of corn and some other crops, no existing planter adequately fulfills all the above requirements. One early type of planter comprised a cylindrical seed hooper having a vertical axis. A circular recess was formed in the base of the hopper and within this recess rotated a disc having semicircular cutouts at regular intervals around its periphery. When seed was placed in the hopper, seeds became lodged in the cutouts in the wheel, theoretically at the rate of one seed per cutout, and were transported around the recess as the wheel rotated. A shield was fixedly mounted within the hopper so as to extend above a portion of the periphery of the rotating wheel, leaving only a small clearance between the upper surface of the wheel and the shield, so that the only seeds which were permitted to enter beneath the shield were those trapped in the cutouts in the wheel. While passing beneath the shield, the cutouts passed successively over a seed discharge opening formed in the bottom of the hopper and were thus allowed to fall from the cutouts onto the ground, the small clearance between the upper surface of the wheel and the shield preventing seeds not received in the cutouts flowing from within the hopper through the seed discharge opening.

This type of planter achieves reasonably accurate metering of the seed, but is only useable at relatively low metering speeds of about ten seeds per second (equivalent to a tractor speed of about four miles per hour). The friction between the wheel and the seeds lying in contact with its upper surface, and between the seeds lodged in the cutouts and the base of the hopper, causes damage to the seeds, and this seed damage increases sharply with tractor speed. At tractor speeds above about four miles per hour, damage to the seed becomes too severe to be acceptable.

A second commercially-produced type of planter comprises a disc rotating in an inclined plane. Twelve "fingers" are distributed over one face of the disc at regular angles. Each of these fingers comprises a shaft capable of pivoting about its own axis and extending substantially radially of the disc and a flat blade extending at right angles to the shaft and lying adjacent the periphery of the disc. A rather complicated cam mechanism is provided to pivot each of the shafts individually between an open position, in which the blade extends away from the plane of the disc at an angle of about 40° to that plane, and a closed position, in which the blade lies substantially parallel to the disc. Seeds flow from a hopper into the lowest part of a cylindrical chamber, of which the disc forms one end wall, and the fingers descend successively through the mass of seeds at the bottom of the chamber. As each finger reaches the lowest point in the chamber, the cam mechanism pivots the shaft of that finger so as to move the blade from its open to its closed position, thus (in theory) trapping a single seed between the blade and the adjacent surface of the disc. As the disc rotates, the seed thus trapped is then carried upwardly past a brush which serves to return any excess seeds which may be adhering to the blade back to the bottom of the chamber. As the blade passes its highest point, the cam mechanism returns the blade from its closed to its open position, thus releasing the trapped seed and allowing it to fall through a seed discharge opening provided adjacent to this point.

Although this seed planter is capable of operating at higher metering speeds than the first type of seed planter described above, it is not capable of metering accurately over a wide range of metering speeds. At low metering speeds, less than about ten seeds per second, the number of seeds delivered is less than the theoretical quantity of one seed per finger per revolution. At metering speeds of the order of about 25-30 seeds per second, the amount of seeds metered is close to the theoretical amount, while at metering speeds as high as about 40 seeds per second, the amount of seed actually delivered exceeds the theoretical amount, in practice usually by as much as about 50%. Farmers are inclined to operate this planter at considerably higher speeds than those recommended by the manufacturer, thus resulting in considerable overplanting. Not only does this overplanting waste seed, but experiments have shown that overplanting actually reduces crop yields, since if more than one seed is planted in a given spot and two or more seeds germinate in the same spot, all the resultant plants tend to be undersized and relatively unproductive. Furthermore, it will be apparent that, because the amount of seed as a proportion of the theoretical amount varies with the metering speed of this type of seed planter, it is difficult to secure uniform application of seed to a field where working conditions (such as field conditions or gradients) force the operator to vary tractor speed in various parts of the field.

A third commercially-produced type of seed planter comprises a disc-shaped rotor disposed in a vertical plane and carrying around its periphery a series of cups. The cups are arranged so that, on the edge of the rotor which is moving upwardly, the cups are open downwardly. A mass of seeds is disposed in the lowest portion of a seed chamber disposed adjacent one side of the rotor, and seeds are forced by air pressure into the cups. The seeds thus trapped in the cups are carried over the highest point on the rotor and, while the cups are descending, the flow of air is interrupted, thus allowing the trapped seeds to fall from the cups. The chief disadvantage of this type of seed planter is the considerable overplanting which it produces; in practice, if the air flow is made strong enough to ensure that at least one seed is trapped in each cup to provide adequate seed planting, in a large proportion of the cups two, three or even more seeds will be trapped. The resultant overplanting leads to the same problems as described above with reference to the second type of seed planter.

All the above types of seed planter also suffer from the problems of timing in delivering their seeds, already discussed above.

The accurate metering of seeds is rendered even more difficult when the seeds to be metered have a flattened shape; important commercial seeds of this type include seed corn and cucumber seeds. If one attempts to use any conventional planter to plant such seeds overplating will result because, whatever type of receptacle is provided in the planter to hold the seed, if the receptacle is large enough to hold a single seed flat on (i.e. with one of the large faces of the seed disposed adjacent the base of the receptacle), the receptacle will accommodate two, three, or even more seeds edge on.

U.S. Pat. No. 3,843,018 issued Oct. 22, 1974 to one of us (Robert G. Holmes), U.S. Pat. No. 3,954,204 issued May 4, 1976 to Becker and U.S. patent application Ser. No. 428,097 of even date herewith, filed by the said Robert G. Holmes and entitled "Seed Planter, Planter Assembly and Method of Picking Up and Discharging A Single Seed", all disclose seed planters in which individual seeds are retained within depressions in a rotor by means of a jet of gas passing through the depression. Both the planters described in U.S. Pat. No. 3,843,018 and in the aforementioned U.S. patent application Ser. No. 428,097 are capable of accurately metering spherical or near-spherical shaped seeds, but, as explained in the aforementioned patent application, are not suitable for metering flat seeds since flat seeds will not develop the necessary Bernoulli forces needed to trap the seed within the depression.

It will thus be seen that there is a need for a seed planter which can accurately meter flat seeds at high metering rates, and this invention seeks to provide such a planter.

SUMMARY OF THE INVENTION

In one aspect, this invention provides a seed planter comprising a seed transport member having a porous surface, gas jet means for directing a jet of gas substantially normally to the porous surface, a seed loading station and a seed unloading station. The seed unloading station of the planter is provided with means for removing a seed from the porous surface as this surface is moved past the seed unloading station. The seed planter also comprises a drive means for moving the porous surface past the seed loading station and thereafter past the seed unloading station.

The invention also provides a planter assembly comprising a frame having a hitch means for attachment of the frame behind a tractor, a plurality of the instant seed planters mounted on the frame and drive connection means for connecting the drive means of each of the seed planters to a power source.

Finally, the invention provides a method of picking up and discharging a single seed. In this method, a seed transport member having a porous surface is moved past a plurality of seeds while a jet of gas is directed substantially normally to the porous surface, thereby retaining a single seed against this surface. The porous surface is moved away from the remainder of the seeds while the retained seed is maintained against the surface by the jet of gas, thereby separating the retained seed from the remainder of the seeds, and the retained seed is thereafter removed from the porous surface.

DETAILED DESCRIPTION OF THE INVENTION

This invention is based upon the discovery that, if a jet of gas is directed against a porous surface and the porous surface is moved past a mass of seeds, one seed and only one seed will be retained against the surface by the gas jet. The reasons why a single seed is consistently retained on the porous surface by the gas jet are not entirely clear, but it is believed (although the invention is in no way limited by this belief) that the seed is held against the surface by drag forces created as the gas flows past the seed. The gas can flow completely around the seed creating a major portion of the drag force, and as the gas flows around the seed lower pressures are created on the back side (i.e. the side towards the surface) of the seed as compared to those exerted on the front surface of the seed. This pressure imbalance on the opposed sides of the seed tends to suck the seed into the surface. Accordingly, the porous surface must be such as to allow proper gas flow around the side of the seed remote from the gas jet, as well as around the side of the seed facing the gas jet. Thus, the term "porous" is used herein to denote any surface which will allow air flow all around a seed resting thereon. Such a surface may be porous in the normal sense of the term; for example, the surface might be constituted by a wire mesh, such as those used in window screens, or might be formed from a metal honeycomb, such as the honeycombs used in aircraft construction, such honeycombs having a plurality of hexagonal prismatic apertures separated by very thin metal walls. Although such meshes and honeycombs do not perform in the instant seed planter as well as the preferred materials described below, they can be made to yield reasonably good results. The porous surface may also be formed of an open-cell foam; the interconnected cells of an open-cell foam allow air flow all around a seed trapped on its surface. However, the use of such foams is not recommended since they do not appear to give particularly results. Closed-cell foams should of course not be used since the discrete cells of such a foam do not permit proper air flow behind the seed.

All the material so far discussed forming the porous surface are porous in the usual sense, that is to say that gas can flow completely through a seed transport member formed of these truly porous materials. However, since it is only necessary for proper operation of the instant seed planter that the porous surface permit gas flow around the face of the seed remote from the gas jet, it is not necessary that gas be able to pass completely through the part of the seed transport member carrying the porous surface. For example, the seed transport member may comprise a relatively thin porous layer fixed to a rigid, non-porous support. Such a seed transport member will permit the proper air flow all around the seed; air flowing behind the seed can leave the seed transport member laterally, even though it cannot pass completely through the seed transport member.

It is desirable that the seed-carrying surface of the seed transport member be not only porous but also resiliently deformable, since it has been found that the use of a resiliently deformable surface improves the accuracy of metering of seeds by the seed transport member. Although it is not entirely clear why a resiliently deformable surface provides more accurate metering than a substantially non-deformable surface such as a metal honeycomb, it is believed (although the invention is in no way limited by this belief) that the seed is pushed into the surface by the forces resulting from the pressure imbalance on its opposed sides, so that the seed deforms the surface and nestles in the small hollow which is thus formed in the surface. The resiliently deformable surface exerts a resistance to the seed as it sinks into the surface and eventually equilibrium is reached. The nestling of the trapped seed into the surface of the porous, resiliently deformable surface holds the trapped seed more securely on the surface and resists any tendency for the seed to move relative to the surface under the forces exerted by, for example, eddies in the gas jet, vibration or the drag forces exerted as the porous, resiliently deformable surface carries a seed retained thereon through a mass of other seeds adjacent the seed loading station. The preferred porous, resiliently deformable surface is the surface of a fiber-covered material comprising a backing and a large number (or pile) of flexible elongate members affixed to, and extending in one direction away from, this backing. The specific presently preferred material for forming the porous, resiliently deformable surface is the artificial turf sold commercially as "Astroturf", this material comprising a backing and a batte of plastic ribbon-like fibers fixed in the backing and extending in one direction away therefrom in a manner similar to the pile of a carpet, so that the whole material resembles natural turf.

In the instant seed planter, the gas jet is directed substantially normally to the porous surface of the seed transport member as that surface passes the seed loading station in order to retain a single seed against a porous surface. Obviously, the gas jet must continue to impinge upon the porous surface for a period sufficient to remove the retained seed from the mass of other seeds which will normally lie adjacent the seed transport member at the seed loading station. Note, however, that it is not absolutely necessary that the gas jet means continue to direct the gas jet onto the porous surface for the whole time that the retained seed is being carried by the seed transport member from the seed loading station to the seed unloading station. For example, depending upon the configuration of the seed transport member, the seed might be retained on the porous surface for at least part of the time by gravity, or mechanical clamping means might be provided to hold the seed against the porous surface once that surface has removed the seed from the remainder of the seeds adjacent the seed loading station. However, retention of the seed by gravity on the porous surface tends to be unsatisfactory in that the seed may be dislodged by vibration and other forces likely to be exerted upon the seed transport member under field conditions, while the use of mechanical clamping means complicates the design of the seed planter. Accordingly, it is preferred that the gas jet means continue to direct the gas jet onto the porous surface, and thus retain a seed thereon, during the whole time that the retained seed is being carried from the porous surface from the seed loading station to the seed unloading station. Such a continuously-operating gas jet means has the advantage that, since the seed is positively retained against the porous surface by the gas jet without reliance on gravity, the porous surface may have any desired inclination to the vertical. In particular, when a continuously-operating gas jet means is used, the porous surface of the seed transport member may be oriented in a vertical plane, thus reducing to a minimum any tendency for excess seeds to adhere to the porous surface and be carried to the seed unloading station.

In order that the seed retained on the porous surface will stay on this surface for the period necessary to separate it from a mass of seeds and to deliver it to the seed unloading station during operation of the instant seed planter, it is obviously necessary that there not be excessive movement of the gas jet across the porous surface i.e. the gas jet should always be directed at the same part of the surface. Indeed, it is very desirable that the instant seed planter be constructed so that there is no possibility of the gas jet drifting relative to the porous surface. To achieve this, it is desirable that the gas jet(s) be defined by a gas supply member, and that the drive means of the seed planter move this gas supply member with the seed transport member. Conveniently, the seed transport member has the form of a disc rotatable about its own axis by the drive means and the gas supply member is rotatable by the drive means about the axis of the disc at the same rate as the disc. This synchronized movement of the gas supply member and disc is conveniently achieved by making the gas supply member in the form of a second disc and mounting both discs for rotation on a common shaft.

It will be apparent that, to ensure that only a single seed is trapped by the gas jet on the porous surface, the diameter of the gas jet should not be too great. Where the gas jet is defined (as is usually the case) by a cylindrical gas supply conduit, the diameter of this conduit should not be more than about 3 mm. and preferably not more than about 1.5 mm. and the length:diameter ratio of the conduit should be at least about 6:1 to ensure that a narrow air jet is formed which will trap only a single seed. The spacing between the outlet end of the conduit and the porous surface is also important, since if this spacing is too great, the gas jet will diverge too much before reaching the surface and either no seed will be retained or more than one seed may be retained. The spacing between the outlet end of the conduit and the porous surface is preferably about 2-4 times the thickness of the seed to be retained, so that for planters to be used with most commercial crops including corn, this spacing should be about 6-12 millimeters.

The retained seed can be removed from the porous surface in any convenient manner; for example, a brush, similar to those used in conventional seed planters to remove excessive seeds which are clinging to a seed transport member, can be used to detach the retained seed from the porous surface. However, desirably the seed removal means comprises means for preventing the gas jet impinging upon the porous surface, thus allowing the seed to fall from the porous surface. For example, the seed removal means may comprise a baffle which is interposed between the gas jet means and the porous surface adjacent the seed unloading station so that the gas jet can no longer impinge upon the porous surface. Alternatively, when (as in the second instant seed planter described below with reference to FIGS. 3 and 4) the gas jet means comprises a member having apertures and a gas plenum disposed adjacent the wall of the apertured member remote from the porous surface and communicating with the apertures, the seed removal means may comprise a valve member which is disposed within the air plenum and which blocks the apertures as each aperture successively passes the seed unloading station, thereby interrupting the flow of gas through the apertures and permitting the retained seeds to leave the porous surface. The seed removal means may also have the form of an auxiliary gas jet which is arranged to create a gas flow across the porous surface when that surface lies adjacent the seed unloading station, thus forcibly blowing the retained seed off the porous surface. The use of such a gas flow seed removal means which forcibly moves the retained seed from the porous surface may have the advantage of reducing small timing errors which may occur when seeds leave the porous surface under gravity.

The gas pressures required to operate the instant planter are small, and the operation of the seed planter is not greatly effected by moderate fluctuations in gas pressure. For example, when using an experimental planter similar to that described below with reference to FIGS. 1 and 2, this planter having four air jets emerging from tubes of approximately 1 mm. internal diameter, the optimum operating pressure is about 5 psig., and this pressure can fluctuate as much as 50% either way without significantly effecting the proper operation of the planter. The relatively small requirements of the instant seed planters, both as regards pressure and volume of gas flow, are such that the instant seed planter assembly may not need a separate gas compressor to provide compressed gas to the planter therein; instead, a commercial-sized instant planter assembly can be supplied with sufficient air by bleeding compressed air from the turbocharger of a tractor (the majority of commercially available diesel tractors are already fitted with turbochargers, and some of these turbochargers are already equipped for compressed air bleeding). Calculations indicate that the turbochargers used on commercially available 400 cubic inch (6.7 liter) diesel tractors will supply sufficient compressed air to meet the needs of an instant planter assembly containing approximately 30 planters without reducing the power output of the tractor engine by more than about 10%. Such a power loss is entirely acceptable, since seed planting is a much less powerintensive operation than, for example, plowing, and thus a tractor does not need to produce more than about half its maximum power output during seed planting. Using the tractor turbocharger to supply compressed air to the planter assembly of course avoids the need for a separate compressor. However, if an unturbocharged tractor is being used or it is desired from some other reason to provide the planter assembly with an independent source of compressed air, the instant planter assembly may of course be provided with an air compressor to supply compressed air to its planters. Such a compressor can conveniently be powered from the power take-off shaft which is found at the rear end of all commercial tractors.

In the instant planter assembly, preferably the drive means of each seed planter comprises a cog belt (a term which is used herein to include a drive chain) a plurality of these belts being driven from a common drive shaft mounted on the frame and extending transversely to the direction in which the assembly is carried by a tractor. The use of a belt as the drive means rather than a chain is desirable since drive chains must be lubricated and, under field conditions, dust, dirt and other debris adhere to the lubricant and tend to foul the chain. Also, desirably the seed planters are movable transversely relative to the frame, thereby enabling the spacing between the rows of seeds planted by the seed planters to be varied.

As already mentioned, the preferred form of seed transport member in the instant planter comprises a disc, which is preferably arranged in a vertical plane so that seeds can fall therefrom under gravity when the seed removal means removes seeds from the porous surface at the seed unloading station. Where the instant planter assembly includes planters having this type of seed transport members, the drive means of the planters and the drive connection means of the planter assembly are preferably arranged such that, when the frame is being moved forwardly by a tractor, the lowest point on each disc is moving rearwardly relative to the frame with a velocity approximately equal to the velocity at which the frame is being moved forwardly by the tractor so that the lowest point on each disc is substantially stationary relative to the ground beneath it. Since the seeds discharged from the seed planters leave the planters adjacent the lowermost point on each disc, the discharged seeds will have little or no horizontal velocity relative to the ground and will thus fall vertically downward from the planter assembly. Such vertical movement of the discharged seeds helps to reduce the timing difficulties already referred to above and caused by collisions between the discharged seeds and various part of prior art planters.

Although the instant seed planter assembly and method are especially useful for handling flat seeds, they can be used to handle any shape of seed, including spherical seeds such as soybean or coated sugar beet seeds.

Figure 1:
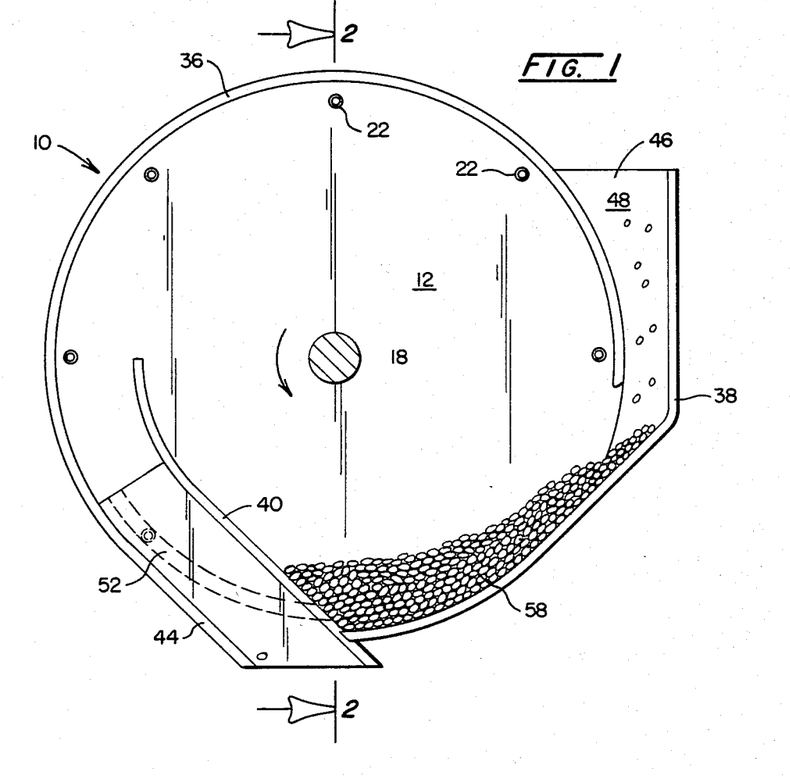
FIG. 1 of the accompanying drawings is a front elevation of a first seed planter of the invention with the seed transport member thereof removed.
Figure 2:
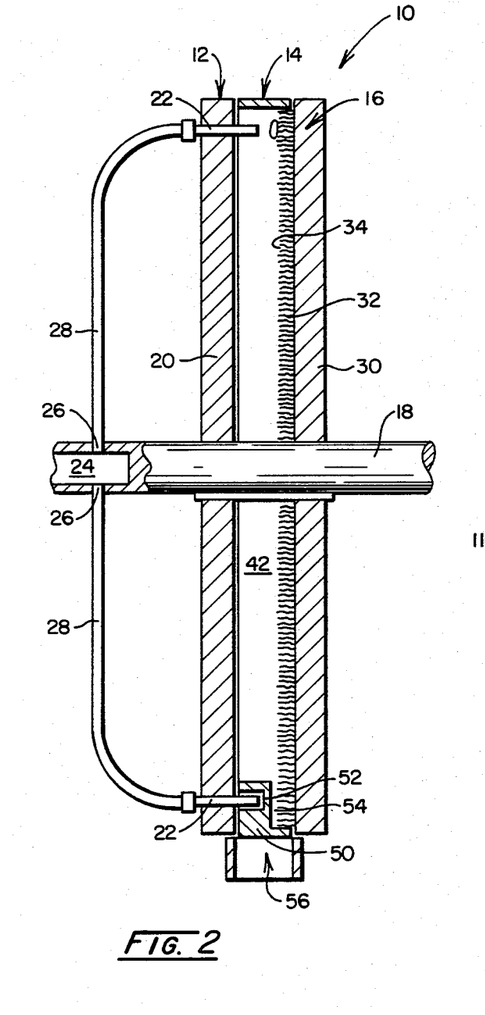
FIG. 2 is a section through the first seed planter along the line 2—2 in FIG. 1.

The first instant seed planter (generally designated 10) shown in FIGS. 1 and 2 of the accompanying drawings is an experimental prototype and comprises three main components, namely, a gas supply member 12, a housing 14 and a seed transport member 16. The gas supply member 12 and the seed transport member 16 are both fixedly mounted upon a rotatable horizontal shaft 18 which is provided with drive means (not shown) for rotating it in the direction shown by the arrow in FIG. 1.

The gas supply member 12 comprises a metal disc 20 disposed in a vertical plane. The disc 20 is pierced by eight bores which extend parallel to the axis of the shaft 18 and which are symmetrically arranged at 45° intervals around the disc 20 adjacent the periphery thereof. Each of these bores accommodates a gas supply member in the form of a metal tube 22 which has an internal diameter of approximately 1 mm. The rearward part of the shaft 18 is provided with an axial bore 24 and with eight symmetrically arranged radial bores 26 which extend from the axial bore 24 radially outwardly to the surface of the shaft 18. Air hoses 28 connect the radial bores 26 to the rear ends of the tubes 22, thus establishing fluid communication between the internal bores within the tubes 22 and the axial bore 24 in the shaft 18. The axial bore 24 is in fluid communication with a source (not shown) of compressed air so that compressed air flows through the axial bore 24, the radial bores 26, the air hoses 28 and the tubes 22, emerging from the forward end of each tube 22 as an air jet directed normally against the rearward surface of the seed transport member 16.

The seed transport member 16 comprises a solid, rigid metal disc 30. The vertical surface of the disc 30 facing the gas supply member 12 is covered with a layer 32 of the artificial turf sold commercially under the trade name "Astroturf". Although not shown in FIG. 2, the "Astroturf" 32 comprises a thin backing material which is adhesively secured to the vertical surface of the disc 30, and a batte of flat, ribbon-like fibers which extend normally from the backing material towards the gas supply member 12. The surface 34 formed by the free ends of these ribbon-like fibers remote from the disc 30 constitutes the porous, resiliently deformable surface of the seed transport member 16; although the batte of fibers is relatively rigid, it will deform somewhat under pressure, and although the disc 30 is not itself porous the surface 34 is porous (as that term is used in this application) since the batte of fibers allows air to flow all around a seed resting thereon, air entering behind the seed resting on the surface 34 being able to flow between adjacent fibers in the batte parallel to the vertical surface of the disc 30.

As best seen in FIG. 1, the housing 14 comprises three separate sections, namely a main section 36, a seed inlet section 38 and a seed discharge section 40. As best seen in FIG. 2, the front edges of all the sections of the housing are disposed adjacent the rear face of the disc 30, while the rear edges of all the housing sections are disposed adjacent the front face of the gas supply member 12. However, small gaps exist between the housing, the disc 30 and the gas supply member 12; these gaps are sufficiently small to prevent seeds passing therethrough but do allow air injected into the housing via the tubes 22 to leave the housing. The housing, the gas supply member 12 and the seed transport member 16 together define a seed cavity 42 (FIG. 2) into which the seeds to be planted are fed. The porous surface defines an inner face adjacent to the seed cavity 42 and spaced from the metal disc 30. The main section 36 of the housing comprises a hemicylindrical portion, which surrounds the upper half of the seed cavity 42, and a lower extension 44, which has the form of a flat plate extending downwardly at 45° from one end of the hemicylindrical portion. The seed inlet housing section 38 has a vertical portion which lies radially outwardly of the adjacent end of the main section 36, and a lower portion extending downwardly at an angle of 45° from the vertical portion and below the adjacent end of the main housing section 36. The extreme lower end of the seed inlet section 38 is accommodated within a groove in the seed discharge section 40, thus closing the lowermost part of the seed cavity 42. If desired, a portion of the seed inlet section 38 adjacent the seed discharge section 40 can be made movable relative to the rest of the housing so as to enable dirt, debris and other undesirable material which invariably accumulates in the lower part of the seed cavity 42 during use to be removed from the seed cavity 42. The vertical portion of the seed inlet housing section 38, the adjacent end of the main housing section 36, a backplate 46 integral with the main housing section 36 and a correspondingly-shaped front plate (not shown) of the same shape and size as the backplate 46 and also integral with the main section 36, together define a seed inlet channel 48. Seeds from a hopper (not shown) positions above the seed inlet channel 48, pass down this channel and through an opening between the lower end of the main housing section 36 and the inclined portion of the seed inlet housing section 38 into the seed cavity 42. To prevent blockages of seed in the channel 48, the narrowest part of this channel should not be less than about ¾ of an inch (19 mm.) wide. As shown in FIG. 1, the seed flowing down the channel 48 accumulates in the lower right quadrant (as shown in FIG. 1) of the seed cavity 42 to form a mass of seed awaiting pickup by the seed transport member 16. This lower right quadrant of the seed planter comprises the seed loading station thereof.

The seed discharge housing section 40 has an upper curved portion and a flat lower portion which extends parallel to the extension 44 of the main housing section 36. A baffle 50 (best seen in FIG. 2) is disposed between the seed discharge housing section 40 and the extension 44, and between the gas supply member 42 and the seed transport member 16. The baffle 50 has an arcuate groove 52 cut in its rear face, this groove 52 being disposed so that, as the rotation of the gas supply member 12 carries each of the tubes 22 in succession past the baffle 50, the parts of the tubes 22 projecting forwardly of the front face of the disc 20 enter the groove 52. The entry of a tube 22 into the groove 52 obviously prevents the air jet emerging from that tube impinging upon the surface 34 on the seed transport member 16, thus permitting a seed retained on the surface 34 to fall downwardly under gravity and leave the surface 34. Thus, that part of the apparatus lying adjacent the baffle 50 constitutes the seed unloading station of the planter. The front surface 54 of the baffle 50, the extension 44 of the main housing section 36, the seed discharge housing section 40 and part of the rear face of the seed transport member 16 together define a seed discharge conduit 56, through which seeds are discharged from the seed planter 10.

The seed planter 10 operates as follows. As already mentioned, seeds from a hopper (not shown) pass down the seed inlet channel 48 and into the seed cavity 42 lying between the gas supply member 12 and the seed transport member 16, so that a mass of seeds 58 accumulates in the lowest part of the seed cavity 42. As the disc 20 of the gas supply member 12 is rotated by the shaft 18 in the direction shown by the arrow in FIG. 1, the tubes 22 pass successively past the mass of seeds 58 lying in the lowest portion of the seed cavity 42. The stream of air passing through each tube 22 traps a single seed on the porous, resiliently deformable surface 34 directly opposite the mouth of each tube 22. To ensure proper retention of the seeds on the surface 34 opposite the tubes 22, the tubes 22 have a length:diameter ratio in excess of 6:1, and in this embodiment about 10:1, while the spacing between the forward end of each tube 22 and the surface 34 is about 8 mm.; this spacing can vary within the range of about 6–12 mm. without substantially affecting the operation of the seed planter.

The single seed thus retained on the surface 34 opposite a tube 22 is then carried upwardly out of the mass of seeds 58, around the upper part of the disc 16 adjacent the heavy cylindrical portion of the main housing section 36 and then downwardly towards the baffle 50. As each tube 22 enters the groove 52 in the baffle 50, the baffle 50 cuts off the air jet issuing from that tube so that the seed retained on the surface 34 by that air jet is no longer held against the surface. Consequently, the seed falls from the surface 34 and leaves the seed planter via the seed discharge conduit 56.

The apparatus shown in FIGS. 1 and 2 operates very satisfactorily with the discs 20 and 30 rotating at 60 revolutions per minute; the accuracy at this speed is better than 99%. Since the planter has only eight tubes 22, at 60 revolutions per minute the planter is only metering eight seeds per second. However, it will be seen from FIG. 1 that the tubes 22 are arranged in a single ring and are widely spaced from one another. By arranging further tubes within the same ring in the large spaces left between the existing tubes 22, and by arranging a further ring of tubes radially inwardly of the existing tubes 22 and positioned midway between the tubes 22, the disc 20 can accommodate at least 48 tubes. This modified form of the planter shown in FIGS. 1 and 2 would be capable of metering 48 seeds per second with high accuracy at a disc speed of only 60 revolutions per minute.

Figure 3:
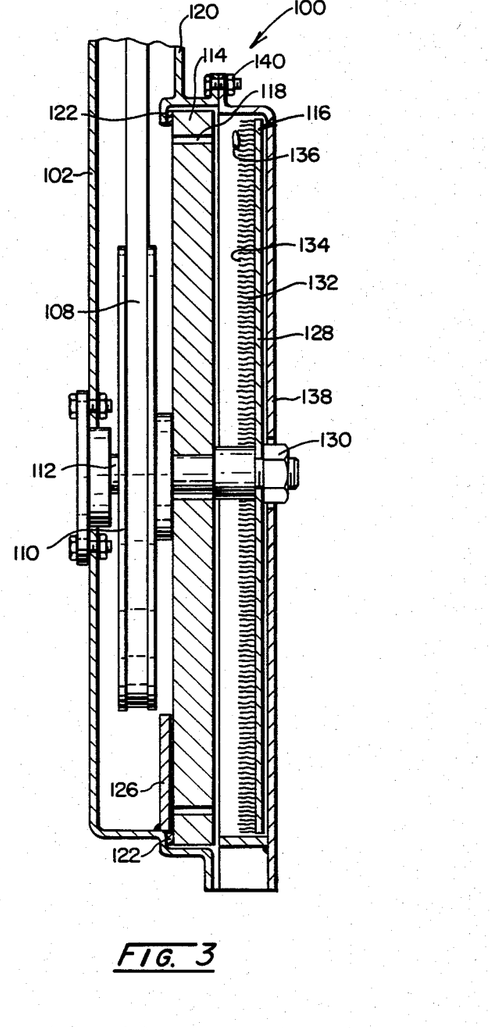
FIG. 3 is a section, similar to that of FIG. 2, through a second seed planter of the invention along the line 3—3 in FIG. 4.
Figure 4:
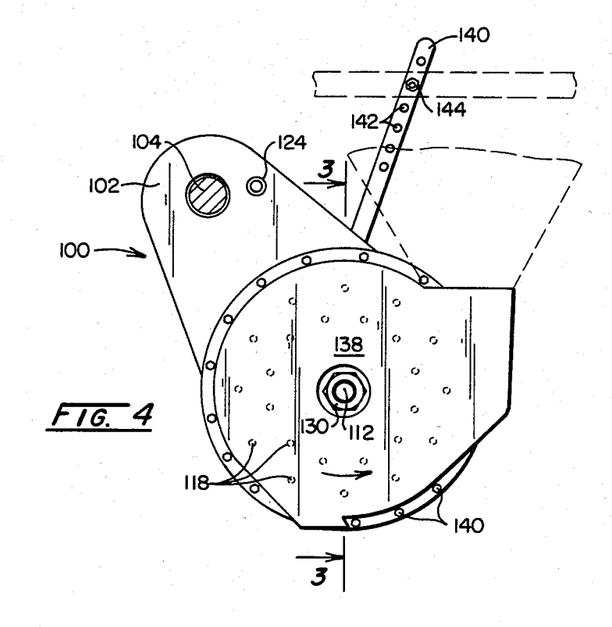
FIG. 4 is a front elevation of the second seed planter shown in FIG. 3 with the seed transport member removed.

The second instant seed planter 100 shown in FIGS. 3 and 4 operates in substantially the same manner as the first planter shown in FIGS. 1 and 2 but differs therefrom in a number of mechanical details. This second planter comprises a belt housing 102 through which passes a drive shaft 104 (FIG. 4), as described in more detail below with reference to FIG. 5, the single drive shaft 104 can be used to power a plurality of planters arranged parallel to one another. A drive sprocket (not shown) is splined onto the drive shaft 104 and a cog belt 108 transmits power from the drive sprocket to a driven sprocket 110. (A drive chain could be substituted for the belt 108, but the use of a drive chain is disadvantageous near field conditions since such a chain must be lubricated and dust, earth and the like tend to adhere to the lubricant and foul the chain.) This driven sprocket 110 is integral with a shaft 112 which is rotatably mounted in the rear face of the housing 102. A gas supply member 114 and a seed transport 116 are both fixedly mounted on the shaft 112 so as to be coaxial with the sprocket 110. (In order to reduce the width of the planter i.e. its maximum dimension parallel to the axis of the shaft 112, as much as possible, the planter shown in FIGS. 3 and 4 may if desired be modified by eliminating the sprocket 110 and allowing the belt 108 to engage the cylindrical surface of the gas supply member 114. It is believed that the necessary changes in the housing 102 and the sealing arrangements for the gas supply member 114 resulting from this modification will be apparent to those skilled in the art.) The gs supply member 114 comprises a metal disc having bores 118 extending axially therethrough; as shown in broken lines in FIG. 4, the bores 118 are arranged in two rings concentric with the axis of the shaft 112, the bores in one ring being disposed midway between bores in the other ring in order to ensure that seeds are picked up and discharged by the seed planter at regular intervals. The disc 114 closes a circular aperture in the front face of the housing 102 and a sealing member 120 formed of self-lubricating plastic is fitted to a flange 122 integral with the housing 102 so as to make sealing contact with the rear face of the disc 114. (Alternatively, the sealing member 120 may be provided on a flange extending in front of the disc 114; this has the advantage that the air pressure behind the disc 114 (see below) will tend to force the plate into engagement with the seal.) A hollow tube 124 (FIG. 4) is provided in the housing 102 to provide fluid communication between the interior of the housing 102 and a compressed air source (not shown). Thus the whole interior of the housing 102 to the rear of the disc 114 acts an air plenum to supply air under pressure to the rear face of the disc 114; air under pressure from this plenum then flows through the bores 118 in the disc 114 to form air jets similar to those provided by the tubes 22 in the first seed planter shown in FIGS. 1 and 2. However, the disc 114 provided with apertures 118 provides a much more robust air supply member than the air supply member 12 of the first seed planter, since the tubes 22 may become damaged, twisted or even broken if debris accumulates within the seed chamber 42 of the first seed planter. In addition, since the disc 114 has a smooth forward face, it is less likely to cause damage to seeds than the air supply member 12, which has the forward ends of the tubes 22 projecting into the seed cavity 42.

Figure 5:
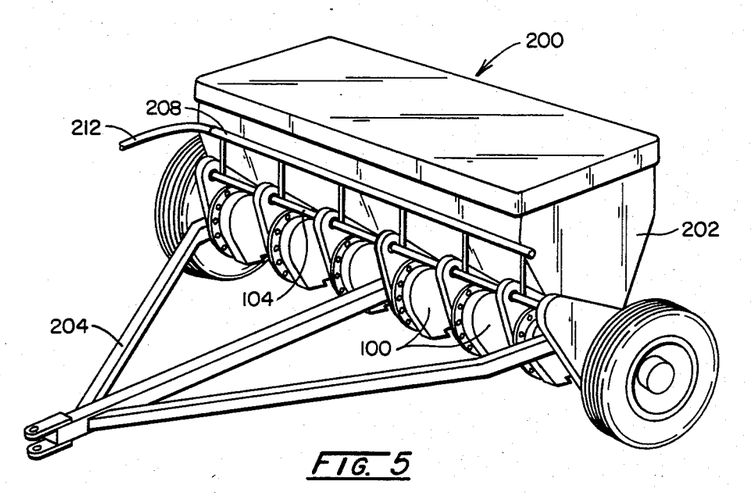
FIG. 5 is a perspective front three-quarter view of a planter assembly of the invention incorporating a plurality of the instant second seed planters as shown in FIGS. 3 and 4.

The second instant seed planter shown in FIGS. 4 and 5 does not have a baffle corresponding to the baffle 50 shown in FIGS. 1 and 2 and lying between the air supply member and the seed transport member of the first instant seed planter. Instead, the seed release means of the second instant seed planter takes the form of a seed release plate 126 fixed to the lowest part of the housing 102 so as to lie closely adjacent the rear face of the disc 114. The seed release plate is 126 is disposed such that, as each bore 118 passes the plate 126, that plate contacts the rear face of the disc 114 surrounding the bore, thus closing the bore and interrupting the air flow therethrough. The seed release plate 126 is made of a resiliently deformable plastic material so that it can move toward and away from the plane of the disc 114 in order to accommodate slight irregularities in the formation of the plate. The seed release plate 126 may be replaced by a roller capable of rotating about a vertical axis; the roller can be made of a deformable material to accommodate irregularities in the shape of the disc 114 and also has the advantage that its operation is less likely to be interfered with by dust, dirt, and other debris which inevitably accumulates in the lowest part of the housing 102 adjacent the plate 126 when the planter is used under field conditions. If desired, the lowest part of the housing 102 may be provided with a releasable door or other means for discharging such debris therefrom in order to prevent malfunction of the planter. If desired, the seed release plate 126 may of course be mounted on the forward face (to the right in FIG. 3) of the gas supply member 114 so as to extend in front of the forward ends of the bores 118. Obviously, when the seed release plate 126 thus lies in front of the gas supply member 114, it functions in substantially the same manner as the baffle 50 shown in FIGS. 1 and 2.

The seed transport member 116 of the second instant seed planter shown in FIGS. 3 and 4 is generally similar to the seed transport member 16 shown in FIGS. 1 and 2 except that, instead of the relatively thick disc 30 shown in FIGS. 1 and 2, the rigid section of the seed transport member 116 only comprises a thin metal plate 128, which is retained in position against a shoulder provided on the shaft 112 by a retaining nut 130 screw-threadedly engaged with a thread provided on the forward end of the shaft 112. The rear face of the plate 128 facing the disc 114 is covered with a layer 132 of "Astroturf," which provides a porous, resiliently deformable surface 134 against which seeds (such as the seeds 136 shown in FIG. 3) can be retained by the air jets issuing from the bores 118 in the disc 114. The seed transport member 116 is covered by a front cover plate 138 which is bolted to the forward edge of the housing 102 by bolts 140.

Since, apart from the substitution of the seed release plate 126 for the baffle 50, the operation of the second instant seed planter shown in FIGS. 3 and 4 is identical to that of the first instant seed planter shown in FIGS. 1 and 2, the operation of the second instant seed planter will be obvious to those skilled in the art from the detailed description of the operation of the first instant seed planter described above with reference to FIGS. 1 and 2.

In order to ensure the greatest accuracy in timing the arrival of the seeds at the planting location, it is desirable to use the seed planter as close to the ground as possible; in fact, when the planter is in use the lowest part of the planter may be disposed within the furrow cut to receive the seeds in order that the seeds may have the shortest possible distance to fall from the planter into the furrow. Accordingly, to allow for differences in furrow depths, the second instant seed planter shown in FIGS. 3 and 4 is arranged to pivot around the drive shaft 104. To enable the housing to be locked in a variety of positions, a bar 140 is pivotally mounted upon the upper face of the housing 102 and a plurality of bores 142 are provided passing through the bar 140. A bolt 144 can be passed through any selected one of the bores 142 and through a similar bore in a frame member (shown in broken lines in FIG. 4) and then secured in position by means of a nut (not shown); the frame member forms part of the planter assembly on which the planter is mounted.

It will be seen that the second instant seed planter shown in FIGS. 3 and 4 can be made of relatively small width (the width of the planter being its maximum dimension parallel to the axes of the shafts 104 and 112) since the belt drive to the sprocket 110 avoids the need for any lengthy, transversely extending shaft. In practice, the width of this seed planter can be made as small as about $1\frac{1}{2}$ or 2 inches (38 or 50 mm.), so that when a plurality of seed planters are disposed side by side on a planter assembly, the planters can plant seeds in rows with as little as about 2 inches (50 mm.) between adjacent rows. This allows for planting rows more closely than can be achieved with conventional seed planters and provides a row spacing which will satisfy the optimum requirements for planting all commercial crops. Since the seed planter can be made so narrow, a single row of planters on a planter assembly will suffice, thus avoiding the complications when a plurality of staggered rows of planters are required to achieve small spacings between rows. Moreover, the very small width of the planter allows it to be used in a double disc furrow opener planter with the planter disposed between the two discs.

Apart from the use of the second instant seed planter shown in FIGS. 3 and 4, the construction of the instant seed planter assembly 200 shown in FIG. 5 is fairly conventional. The seed planter comprises a frame 202 provided with a hitch 204 by means of which the planter is towed behind a tractor. The frame 202 carries a plurality of seed planters 100 identical to those shown in FIGS. 3 and 4, these planters being arranged in a single row extending transversely across the frame and being driven from a single device shaft 104. The drive shaft 104 is itself driven from one of two wheels which contact the ground. As in conventional planters, the use of a drive from a freely rotating wheel ensures that the rate of rotation of the seed transport members in the planters of the planter assembly is exactly proportional to the rate of movement of the planter assembly across the ground, thus ensuring uniform spacing between adjacent seeds regardless of the speed at which the planter assembly is towed by the tractor. Also, the driven mechanism is so arranged that, when the planter assembly is being towed forwardly by a tractor, the lowest point on each seed transport member is moving rearwardly relative to the frame 202 with a velocity equal to that at which the frame is being towed forwardly by the tractor, so that the lowest point on each seed transport member is stationary relative to the ground below it. As already mentioned, this arrangement helps to reduce timing errors in delivery of seeds from the planters.

Compressed air is fed to the planters 100 from a main air duct 208 which extends behind, above and parallel to the drive shaft 104; an air hose is provided linking this main air duct to the hollow tube 118 (FIG. 4) which feeds air into the housing 102 of each seed planter 100. The main air duct 208 is supplied with air under pressure from an air hose 212, which connects the main air duct 208 to the turbocharger (not shown) on the diesel engine of the tractor. Calculations indicate that the turbochargers used on commercially available 400 cubic inch (6.7 liter) diesel tractors will supply sufficient compressed air to meet the needs of a planter assembly containing approximately 30 planters without reducing the power output of the tractor engine by more than about 10%. Such a power loss is entirely acceptable, since seed planting is a much less power-intensive operation than, for example, plowing, and thus a tractor does not need to produce more than about half its maximum power output during seed planting. Using the tractor turbocharger to supply compressed air to the planter assembly of course avoids the need for a separate compressor. However, if an unturbocharged tractor is being used or if desired for some other reason to provide the planter assembly with an independent source of compressed air, the main air duct may of course be supplied with compressed air from a compressor mounted on the planter assembly. This compressor is conveniently powered from the conventional power take-off shaft found at the rear end of all commercial tractors.

It will be apparent to those skilled in the art that numerous changes and modifications can be made in the specific embodiments of the invention described above without departing from the scope of the invention. By way of example, although the seed transport members of the specific preferred embodiments of the invention shown in the drawings have the form of vertical discs with one circular, seed-carrying face, the seed transport member may have the form of a hollow cylinder with the porous surface on the inwardly-facing cylindrical surface of this hollow cylinder. The gas supply member of an instant seed planter incorporating such a hollow cylindrical seed transport member might have the form of a hollow shaft passing axially through the hollow cylindrical seed transport member and having a plurality of open-ended tubes extending radially outwardly therefrom. Alternatively, the gas supply member could have the form of a second hollow cylinder coaxial with and lying within the seed transport member. The hollow interior of such a cylindrical gas supply member could act as an air plenum to feed radial bores extending through the cylindrical wall of the gas supply member to form air jets impinging upon the porous surface of the seed transport member. When using a hollow cylindrical seed transport member, it may be convenient to arrange for the seed loading station to be at the lowest point of the cylinder and the seed unloading station to be at the highest point and to provide a seed discharge member extending axially within the hollow cylindrical seed transport member adjacent the uppermost part thereof to catch the seeds which fall from the porous surface as that porous surface passes the highest point of the cylinder. Accordingly, the foregoing description is to be construed in an illustrative and not in a limitative sense, the scope of the invention being defined solely by the appended claims.

We claim:

1. A seed planter comprising:
a seed transport member having a porous surface, said porous surface having an inner face adjacent to a seed loading station, said inner face supporting seeds in spaced relationship to said transport member such that, when a seed is resting on said inner face of said porous surface and a jet of gas is directed at said seed normally and towards said porous surface, said inner face of said porous surface will allow air flow around the whole surface of said seed, including the side of said seed remote from said jet of gas;
a seed loading station;
a seed unloading station provided with seed removal means for removing a seed from said porous surface as said porous surface is moved past said seed unloading station;
gas jet means for directing a jet of gas substantially normally to the part of said porous surface lying adjacent said seed loading station as said part of said porous surface passes said seed loading station; and
drive means for moving said porous surface past said seed loading station and thereafter past said seed unloading station.

2. A seed planter according to claim 1 wherein said seed removal means comprises means for interrupting the flow of said jet of gas.

3. A seed planter according to claim 1 wherein said porous surface is resiliently deformable and wherein said jet of gas causes a seed resting upon said porous surface to deform said porous surface, thereby forming a hollow in said surface wherein said seed rests.

4. A seed planter according to claim 3 wherein said porous, resiliently deformable surface comprises the surface of a material comprising a backing and a pile of flexible, elongate members affixed to, and extending in one direction away from, said backing.

5. A seed planter according to claim 1 wherein said gas jet means comprises a gas supply member having walls defining at least one gas supply conduit, said gas supply member being movable by said drive means so that no relative movement occurs between said gas supply member and said seed transport member, said gas jet means further comprising means for supplying gas to said gas supply conduit.

6. A seed planter according to claim 5 wherein said gas supply member comprises a plurality of tubes having internal diameters of not more than 3 mm.

7. A seed planter according to claim 5 wherein said gas supply member comprises a plate, said gas supply conduit comprises at least one aperture extending through said plate and said gas supply means further comprises a housing defining a gas plenum communicating with the end of said aperture remote from said porous surface.

8. A seed planter according to claim 5 wherein said seed transport member has the form of a disc rotatable about its own axis by said drive means and wherein said gas supply member is rotatable by said drive means about said axis of said disc at the same rate as said disc.

9. A seed planter according to claim 5 wherein the distance between the outlet end of said gas supply conduit and said porous surface is from 6 to 12 mm.

10. A planter assembly comprising:
a frame having a hitch means for attachment of said frame behind a tractor;
a plurality of seed planters mounted on said frame, each seed planter comprising a seed transport member having a porous surface, said porous surface having an inner face adjacent to a seed loading station, said inner face supporting seeds in spaced relationship to said transport member such that, when a seed is resting on said inner face of said porous surface and a jet of gas is directed at said seed normally and towards said porous surface, said inner face of said porous surface will allow air flow around the whole surface of said seed, including the side of said seed remote from said jet of gas; a seed loading station; a seed unloading station provided with seed removal means for removing a seed from said porous surface as said porous surface is moved past said seed unloading station; gas jet means for directing a jet of gas substantially normally to the part of said porous surface as lying adjacent said seed loading station as said part of said porous surface passes said seed loading station; and drive means for moving said porous surface past said seed loading station and thereafter past said seed unloading station; and drive connection means for connecting the drive means of each of said seed planters to a power source.

11. A planter assembly according to claim 10 wherein said porous surface at least one of said planters is also resiliently deformable and wherein said jet of gas causes a seed resting upon said porous surface to deform said porous surface, thereby forming a hollow in said surface wherein said seed rests.

12. A planter assembly according to claim 11 wherein said porous, resiliently deformable surface comprises the surface of a material comprising a backing and a pile of flexible, elongate members affixed to, and extending in one direction away from, said backing.

13. A planter assembly according to claim 10 wherein said drive means of each of said planters comprises a belt, and wherein said drive connection means comprises a drive shaft extending transversely to the direction in which said assembly is carried by said tractor, said driving shaft driving said belts of a plurality of said planters.

14. A planter assembly according to claim 13 wherein said seed transport members of said seed planters have the form of vertical discs, and said drive means of said seed planters and said drive connection means are arranged such that, when said frame is being moved forwardly by a tractor, the lowest point on each disc is moving rearwardly relative to said frame with a velocity approximately equal to the velocity at which the frame is being moved forwardly by said tractor, so that said lowest point is substantially stationary relative to the ground therebeneath.

15. A planter assembly according to claim 13 wherein said seed planters are movable transversely relative to said frame, thereby enabling the spacing between the rows of seeds planted by said seed planters to be varied.

16. A method of picking up and discharging a single seed, which method comprises:

providing a seed transport member having a porous surface, said porous surface having an inner face adjacent to a seed loading station, said inner face supporting seeds in spaced relationship to said transport member such that, when a seed is resting on said inner face of said porous surface and a jet of gas is directed at said seed normally to and towards said porous surface, said inner face of said porous surface will allow air flow around the whole surface of said seed including the side of said seed remote from said jet of gas;

moving said porous surface past a plurality of seeds while directing a jet of gas substantially normally to the part of said porous surface lying adjacent said plurality of seeds, thereby retaining a single seed against said porous surface;

moving said porous surface away from the remainder of said seeds while maintaining said retained seed against said porous surface by said jet of gas, thereby separating said retained seed from the remainder of said seeds; and removing said retained seed from said porous surface.

17. A method according to claim 16 wherein said removal of said retained seed is effected by interrupting said jet of gas, thereby allowing said retained seed to leave said porous surface.

18. A method according to claim 16 wherein said seed transport member has the form of a disc rotating in a substantially vertical plane, said porous surface is provided in one circular face of said disc, said single seed is retained on said porous surface while said surface is moving upwardly and said retained seed leaves said porous surface while said surface is moving downwardly.

19. A method according to claim 16 wherein said porous surface of said seed transport member is resiliently deformable and wherein said jet of gas causes a seed resting upon said porous surface to deform said porous surface, thereby forming a hollow in said surface wherein said seed rests.

20. A method according to claim 19 wherein said porous, resiliently deformable surface comprises the surface of a material comprising a backing and a pile of flexible, elongate members affixed to, and extending in one direction away from, said backing.

* * * * *